(12) United States Patent
Kitagawa et al.

(10) Patent No.: US 7,708,029 B2
(45) Date of Patent: May 4, 2010

(54) COUPLING MEMBER OF PIPE COUPLING

(75) Inventors: Hiroyuki Kitagawa, Chiba (JP); Masayuki Imaizumi, Kawasaki (JP); Koji Matsumoto, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 11/823,431

(22) Filed: Jun. 27, 2007

(65) Prior Publication Data

US 2007/0246107 A1   Oct. 25, 2007

Related U.S. Application Data

(63) Continuation of application No. PCT/JP2005/023706, filed on Dec. 26, 2005.

(30) Foreign Application Priority Data

Dec. 28, 2004   (JP) .............................. 2004-381060

(51) Int. Cl.
    *F16L 37/32* (2006.01)
(52) U.S. Cl. ................. 137/614.03; 251/149.6
(58) Field of Classification Search .......... 137/614.04, 137/614.03, 614.05; 277/584, 586, 587, 277/435, 641, 644; 251/149.1, 149.6, 359, 251/900
See application file for complete search history.

(56) References Cited

U.S. PATENT DOCUMENTS

| | | | | |
|---|---|---|---|---|
| 2,299,193 A | * | 10/1942 | Trautman | 137/614.04 |
| 2,425,500 A | * | 8/1947 | Wiggins | 137/614.04 |
| 2,451,441 A | * | 10/1948 | Main, Jr. | 137/614.04 |
| 2,461,705 A | * | 2/1949 | Stranberg | 137/614.04 |
| 2,862,736 A | * | 12/1958 | Russell | 277/641 |
| 3,234,965 A | * | 2/1966 | Anderson | 137/614.04 |
| 3,525,361 A | * | 8/1970 | Jeromson, Jr. et al. | 137/614.04 |
| 3,525,530 A | * | 8/1970 | Bauer et al. | 277/451 |
| 3,554,567 A | * | 1/1971 | Carroll et al. | 277/641 |
| 3,570,543 A | * | 3/1971 | Ekman | 137/614.04 |
| 3,622,168 A | * | 11/1971 | Woodling | 277/586 |
| 3,777,771 A | * | 12/1973 | De Visscher | 137/614.04 |
| 4,121,838 A | * | 10/1978 | Sakamaki | 277/586 |
| 4,637,432 A | * | 1/1987 | Medvick et al. | 137/614.04 |
| 4,691,941 A | * | 9/1987 | Rabushka et al. | 137/614.04 |
| 4,694,859 A | * | 9/1987 | Smith, III | 137/614.04 |

(Continued)

FOREIGN PATENT DOCUMENTS

JP   50-124624 U   10/1975

(Continued)

*Primary Examiner*—John Rivell
*Assistant Examiner*—Craig Price
(74) *Attorney, Agent, or Firm*—Brinks Hofer Gilson & Lione

(57) ABSTRACT

A coupling member is provided that comprises a valve movable between a closed position and an opening position. The valve is provided with a seal ring fixed in an annular groove formed in the valve and urged against a valve seat in the closed position. The groove has a forward annular groove portion and a rear annular groove portion shallower than the forward annular groove portion. The seal ring has forward and rear annular seal portions fitted in the forward and rear annular groove portions, respectively. The rear ring portion has substantially the same diameter as the forward seal portion.

1 Claim, 5 Drawing Sheets

U.S. PATENT DOCUMENTS

| | | | | |
|---|---|---|---|---|
| 4,709,725 | A | * | 12/1987 | Morrison ............... 137/614.04 |
| 4,754,780 | A | * | 7/1988 | Smith, III ............. 137/614.04 |
| 4,907,651 | A | * | 3/1990 | Bou-Mikael ................ 277/641 |
| 5,144,979 | A | * | 9/1992 | Shobuzako et al. .... 137/614.04 |
| 5,806,564 | A | * | 9/1998 | Wilcox .................. 137/614.05 |
| 5,829,480 | A | * | 11/1998 | Smith, III ............. 137/614.04 |
| 6,206,040 | B1 | * | 3/2001 | Smith, III ............. 137/614.04 |
| 6,637,726 | B1 | * | 10/2003 | Yamamoto ............... 251/149.1 |

FOREIGN PATENT DOCUMENTS

| | | |
|---|---|---|
| JP | 3-105797 U | 11/1991 |
| JP | 5-87393 U | 11/1993 |

\* cited by examiner

[Fig. 1]
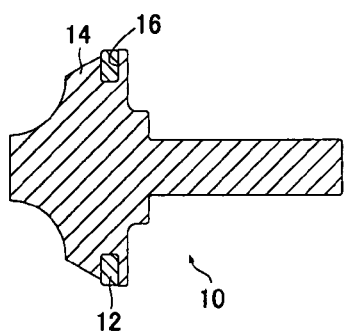
[Fig. 2]
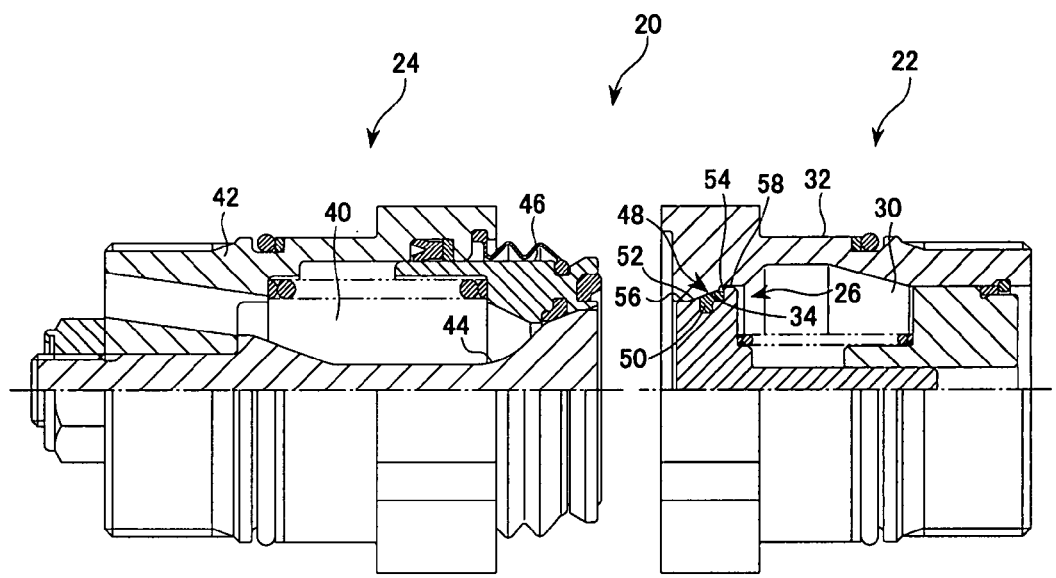

[Fig. 3]
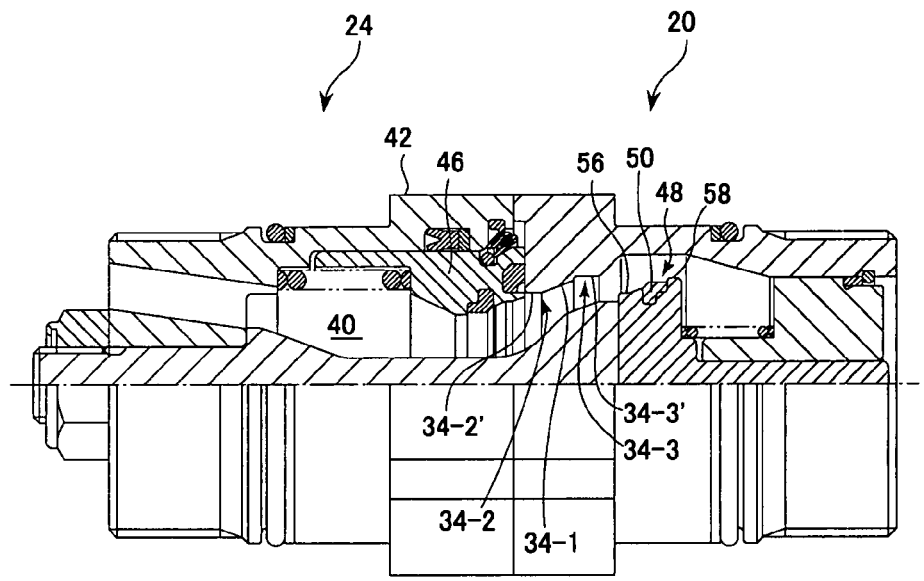
[Fig. 4]
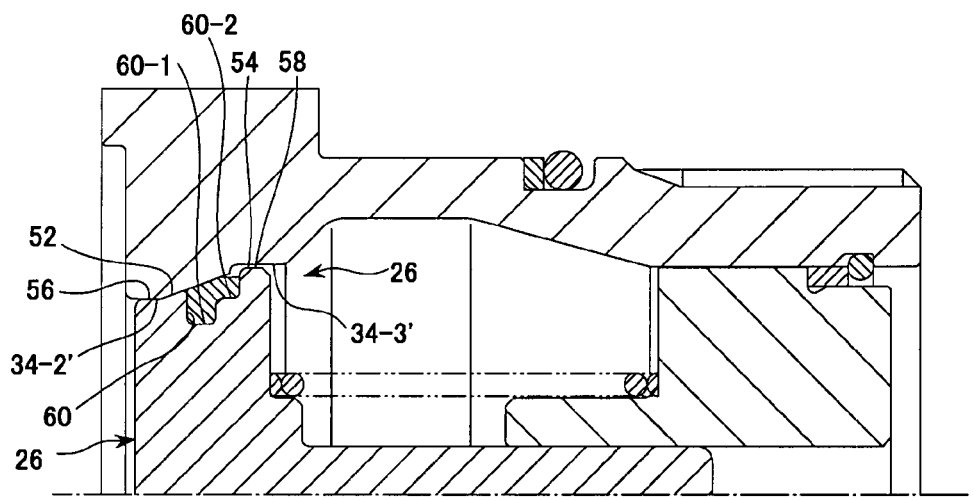

[Fig. 5]
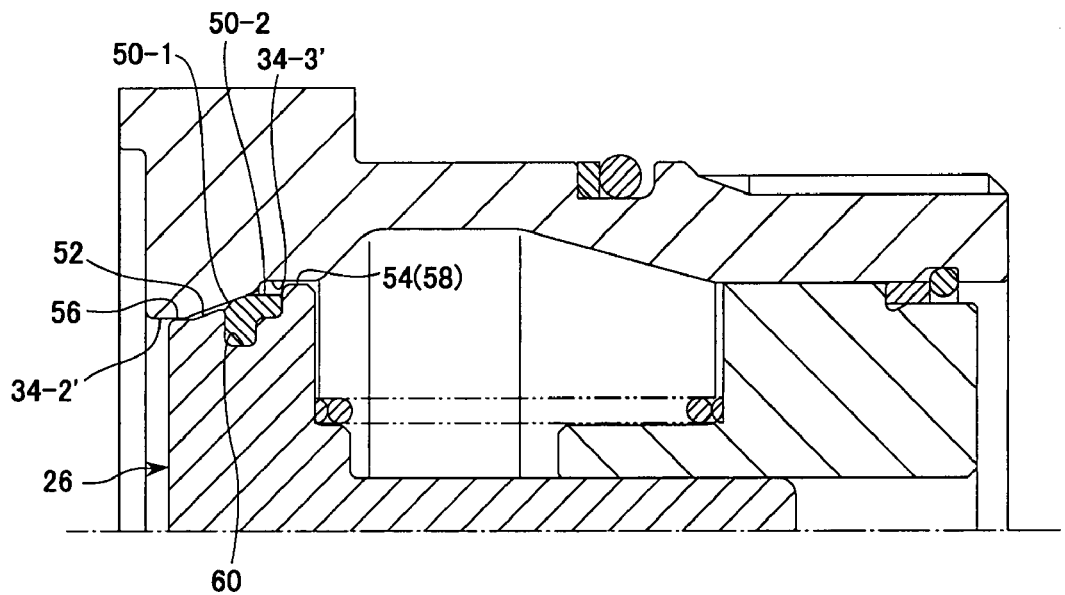
[Fig. 6]
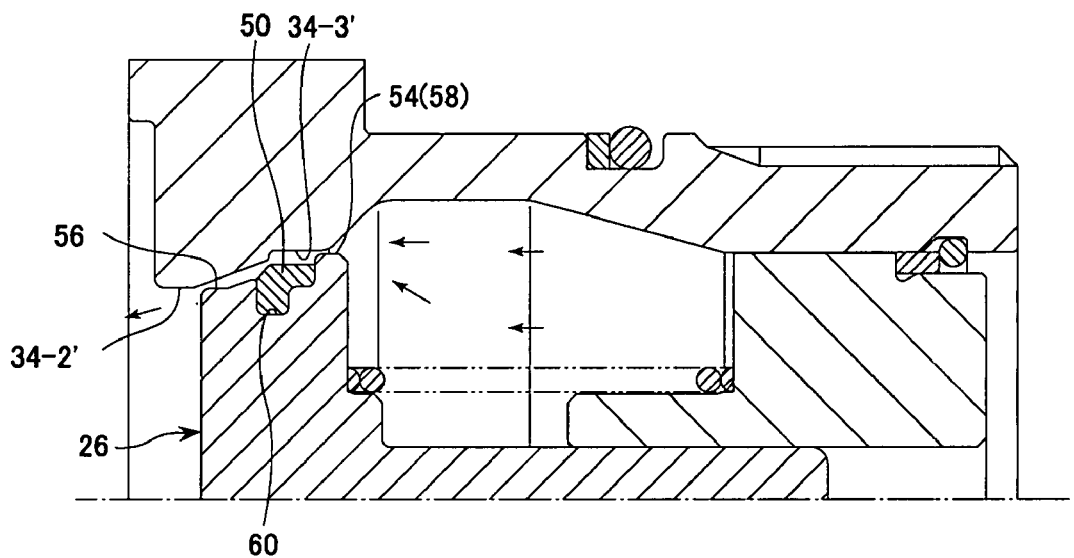

[Fig. 7]
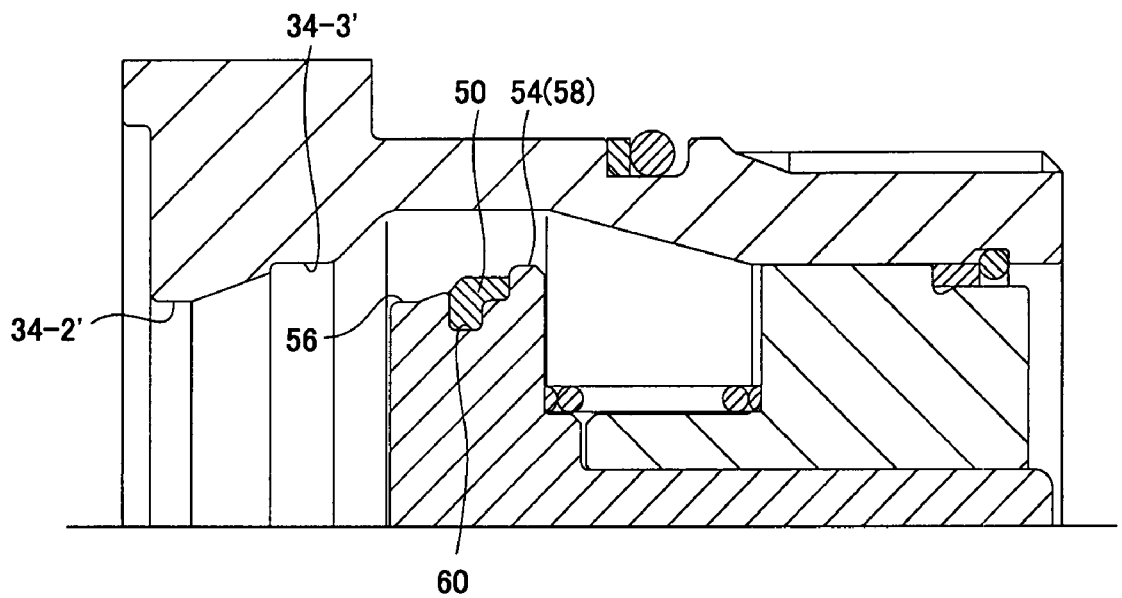
[Fig. 8]
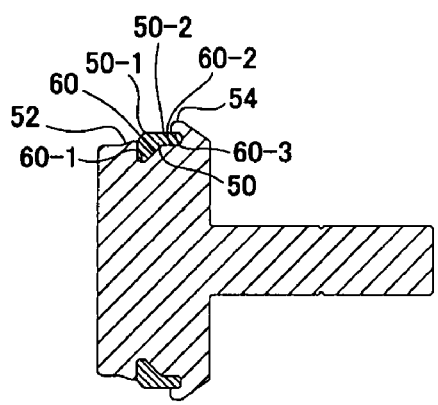

[Fig. 9]
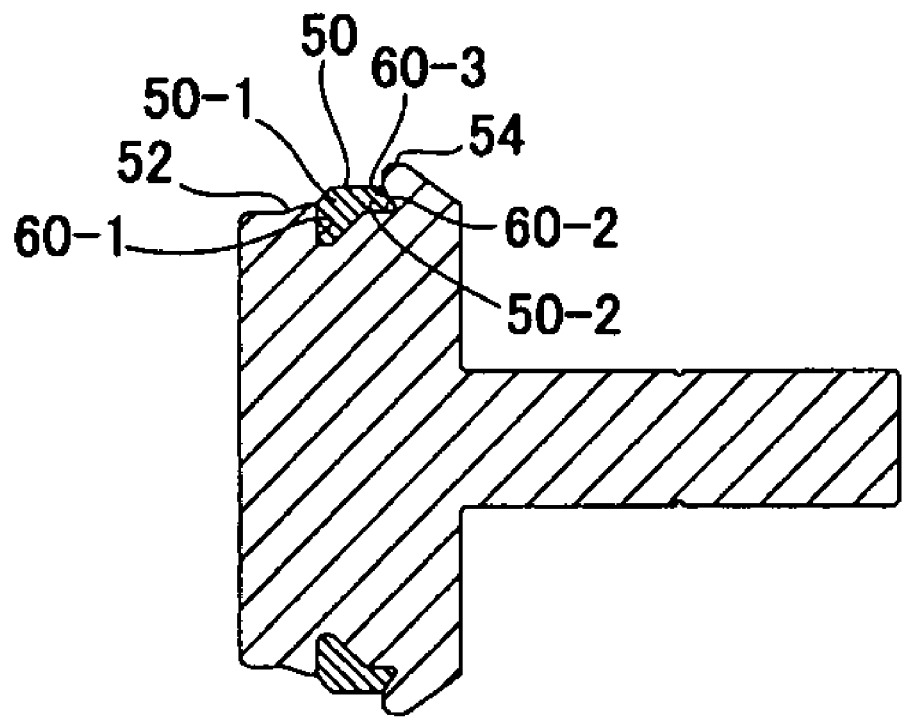
[Fig. 10]
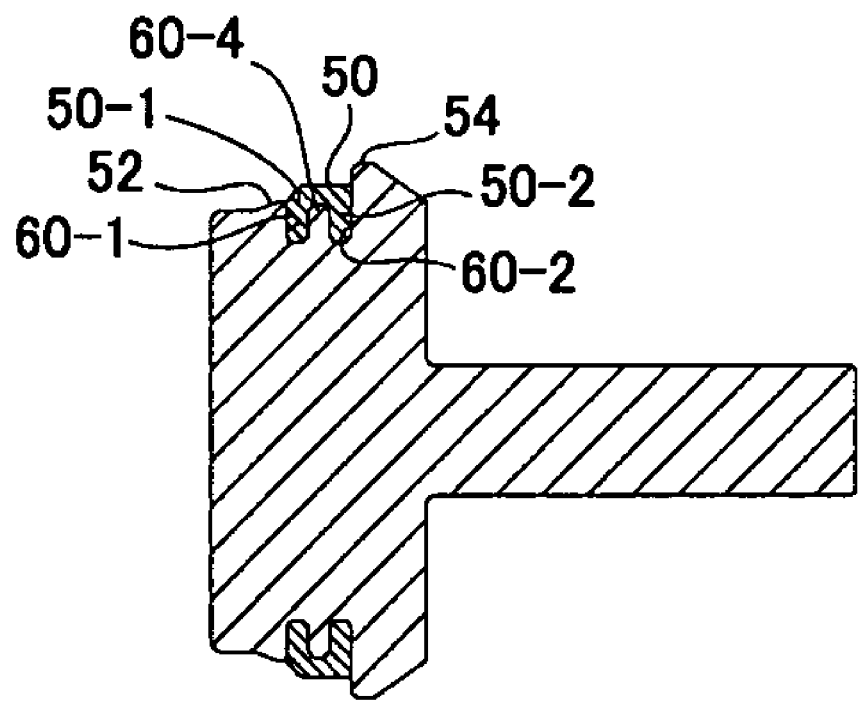

COUPLING MEMBER OF PIPE COUPLING

This application is a continuation of PCT/JP/2005/023706, filed Dec. 26, 2005, which claims priority to Japanese Application No. JP2004-381060 filed Dec. 28, 2004. The entire contents of these applications are incorporated herein by reference.

TECHNICAL FIELD

The present invention relates to a coupling member of a pipe coupling having a male coupling member and a female coupling member.

BACKGROUND ART

A male coupling member and a female coupling member of a pipe coupling are commonly equipped with an on-off valve that closes a fluid passage formed through the male and female coupling members to prevent fluid from flowing out therefrom when the coupling members are decoupled from each other. In the decoupled state, if a hose connected to the coupling members is, for example, twisted, an excessively high internal pressure may be generated therein. If the coupling members are recoupled together in such a state, the fluid rapidly flows around the on-off valve as it slightly opens. Such rapid flow of fluid creates a negative pressure around the surface of the on-off valve that has just separated from the associated annular valve seat surface. The negative pressure causes a seal ring provided on the valve surface to be deformed toward the fluid passage. The seal ring thus deformed is subjected to excessive force from the fluid and hence likely to separate from the on-off valve.

There have been developed a variety of coupling members adapted to enable the internal pressure to be removed from the coupling members before they are coupled together (see, for example, Japanese Utility Model Registration Application Publication No. Sho 50-124624). The main purpose of pressure removal in this case is to solve the problem that when the internal pressure is high, it is difficult to push open the on-off valve because of the high internal pressure when the male and female coupling members are put to each other to couple them together.

In a pipe coupling used in a die-casting machine or the like, however, strong force is applied to couple the coupling members. Therefore, even if the pressure in the coupling members is rather high, the on-off valve can be pushed in to couple the coupling members. In this case, the high-pressure fluid remaining in the coupling member rapidly flows around the on-off valve, and the seal ring is likely to separate, as has been stated above.

There is likelihood of the seal ring being separated under any circumstances where the fluid rapidly flows around the on-off valve, not only when the coupling members are coupled together as stated above.

The present invention has been made in view of the above-described conventional technique. Accordingly, an object of the present invention is to provide a coupling member adapted to minimize the occurrence of separation of the seal ring by the rapid flow of fluid around the on-off valve when it is opened.

FIG. 1 shows a seal ring 12 used in a conventional on-off valve 10, that is, a seal ring with a rectangular section that is fitted and fixed in an annular groove 16 formed on a valve head 14. The inventor of this application considered that the configuration of this seal ring also relates to the separation of the seal ring, and improved the seal ring configuration to provide a pipe coupling adapted so that separation of the seal ring is unlikely to occur.

SUMMARY OF THE INVENTION

That is, the present invention provides a coupling member of a pipe coupling having a male coupling member and a female coupling member that are couplable to each other. The coupling member includes a tubular member having a fluid passage. The tubular member has an annular valve seat surface formed so as to surround the fluid passage. An on-off valve is provided in the fluid passage of the tubular member. The on-off valve is movable between a closed position where it is engaged under pressure with the annular valve seat surface to close the fluid passage and an open position where the on-off valve is displaced rearward in the axial direction of the fluid passage to separate from the annular valve seat surface, thereby opening the fluid passage. The on-off valve has an annular valve surface facing the annular valve seat surface. A seal ring is provided on the annular valve surface. When the on-off valve is in the closed position for closing the fluid passage, the seal ring is sealingly engaged under pressure with the annular valve seat surface. The annular valve surface has a rear annular valve surface portion located rearward of the seal ring. The rear annular valve surface portion has a rear annular passage limiting portion adapted to be in contact with or close proximity to the annular valve seat surface. During the period from when the on-off valve starts to move from the closed position toward the open position until the seal ring has separated from the annular valve seat surface by a predetermined distance, the rear annular passage limiting portion is moved while keeping in contact with or close proximity to the annular valve seat surface.

Specifically, the coupling member may be arranged as follows. The annular valve seat surface has an annular sealing valve seat surface that is sealingly engaged by the seal ring when the on-off valve is in the closed position. The annular valve seat surface further has an annular forward valve seat surface and an annular rear valve seat surface located forward and rearward, respectively, of the annular sealing valve seat surface. The annular rear valve seat surface has a rear axial surface that extends substantially parallel to the axis. During the period from when the on-off valve starts to move from the closed position toward the open position until the seal ring has separated from the annular valve seat surface by a predetermined distance, the rear annular passage limiting portion is moved while keeping in contact with or close proximity to the rear axial surface.

In addition, the present invention provides a coupling member of a pipe coupling having a male coupling member and a female coupling member that are couplable to each other. The coupling member includes a tubular member having a fluid passage. The tubular member has an annular valve seat surface formed so as to surround the fluid passage. An on-off valve is provided in the fluid passage of the tubular member. The on-off valve is movable between a closed position where it is engaged under pressure with the annular valve seat surface to close the fluid passage and an open position where the on-off valve is displaced rearward in the axial direction of the fluid passage to separate from the annular valve seat surface, thereby opening the fluid passage. The on-off valve has an annular valve surface facing the annular valve seat surface. A seal ring is provided on the annular valve surface. When the on-off valve is in the closed position for closing the fluid passage, the seal ring is sealingly engaged under pressure with the annular valve seat surface. The annular valve surface has a forward annular valve surface portion located forward of the seal ring. The forward annular valve surface portion has a forward annular passage limiting portion adapted to be in contact with or close proximity to the annular valve seat surface. During the period from when the on-off valve starts to move from the closed position toward the open position until the seal ring has separated from the annular valve seat surface by a predetermined distance, the forward annular passage limiting portion is moved while keeping in contact with or close proximity to the annular valve seat surface.

Specifically, the coupling member may be arranged as follows. The annular valve seat surface has an annular sealing valve seat surface that is sealingly engaged by the seal ring when the on-off valve is in the closed position. The annular valve seat surface further has an annular forward valve seat surface and an annular rear valve seat surface located forward and rearward, respectively, of the annular sealing valve seat surface. The annular forward valve seat surface has a forward axial surface that extends substantially parallel to the axis. During the period from when the on-off valve starts to move from the closed position toward the open position until the seal ring has separated from the annular valve seat surface by a predetermined distance, the forward annular passage limiting portion is moved while keeping in contact with or close proximity to the forward axial surface.

Further, the coupling member may be arranged as follows. The annular valve surface has an annular groove formed between the forward annular valve surface portion and the rear annular valve surface portion. The seal ring is fitted and fixed in the annular groove. The annular groove has a forward annular groove portion and a rear annular groove portion shallower than the forward annular groove portion. The rear annular valve surface portion of the annular valve surface has a larger radius than that of the forward annular valve surface portion. The seal ring has a forward annular seal portion fitted in the forward annular groove portion and having a larger radius than that of the forward annular valve surface portion of the annular valve surface. The seal ring further has a rear annular seal portion contiguous with the forward annular seal portion and having an outer diameter that is substantially the same as that of the forward annular seal portion but smaller than that of the rear annular valve surface portion. The rear annular seal portion is fitted and fixed in the rear annular groove portion.

More specifically, the coupling member may be arranged as follows. The rear annular groove portion has a rear extension groove portion extending rearward by a predetermined length at a position radially inward of the rear annular valve surface portion of the annular valve surface. The rear annular seal portion extends to be fitted and fixed in the rear extension groove portion of the rear annular groove portion.

Further, the coupling member may be arranged as follows. The annular valve surface has an annular groove formed between the forward annular valve surface portion and the rear annular valve surface portion. The seal ring is fitted and fixed in the annular groove. The annular groove has a forward annular groove portion, a rear annular groove portion, and an annular raised portion raised between the forward and rear annular groove portions. The annular raised portion has substantially the same radius as that of the forward annular valve surface portion. The seal ring has a U-shape in a section containing the axis and has an outer diameter larger than that of the forward annular valve surface portion but smaller than that of the rear annular valve surface portion.

In addition, the present invention provides a coupling member of a pipe coupling having a male coupling member and a female coupling member that are couplable to each other. The coupling member includes a tubular member having a fluid passage. The tubular member has an annular valve seat surface formed so as to surround the fluid passage. An on-off valve is provided in the fluid passage of the tubular member. The on-off valve is movable between a closed position where it is engaged under pressure with the annular valve seat surface to close the fluid passage and an open position where the on-off valve is displaced rearward in the axial direction of the fluid passage to separate from the annular valve seat surface, thereby opening the fluid passage. The on-off valve has an annular valve surface facing the annular valve seat surface. A seal ring is fitted and fixed in an annular groove formed on the annular valve surface. The annular groove has a forward annular groove portion and a rear annular groove portion shallower than the forward annular groove portion. The annular valve surface has a forward annular valve surface portion contiguous with and extending forward from the forward annular groove portion. The annular valve surface further has a rear annular valve surface portion contiguous with and extending rearward from the rear annular groove portion. The rear annular valve surface portion has a larger radius than that of the forward annular valve surface portion. The seal ring has a forward annular seal portion fitted in the forward annular groove portion and having a larger outer diameter than that of the forward annular valve surface portion of the annular valve surface. The seal ring further has a rear annular seal portion contiguous with the forward annular seal portion and having an outer diameter that is substantially the same as that of the forward annular seal portion but smaller than that of the rear annular valve surface portion. The rear annular seal portion is fitted and fixed in the rear annular groove portion.

Specifically, the coupling member may be arranged as follows. The rear annular groove portion of the annular groove has a rear extension groove portion extending rearward by a predetermined length at a position radially inward of the rear annular valve surface portion. The rear annular seal portion extends to be fitted and fixed in the rear extension groove portion.

In addition, the present invention provides a coupling member of a pipe coupling having a male coupling member and a female coupling member that are couplable to each other. The coupling member includes a tubular member having a fluid passage. The tubular member has an annular valve seat surface formed so as to surround the fluid passage. An on-off valve is provided in the fluid passage of the tubular member. The on-off valve is movable between a closed position where it is engaged under pressure with the annular valve seat surface to close the fluid passage and an open position where the on-off valve is displaced rearward in the axial direction of the fluid passage to separate from the annular valve seat surface, thereby opening the fluid passage. The on-off valve has an annular valve surface facing the annular valve seat surface. A seal ring is fitted and fixed in an annular groove formed on the annular valve surface. The annular valve surface has a forward annular valve surface portion and a rear annular valve surface portion that are located forward and rearward, respectively, of the annular groove. The annular groove has a forward annular groove portion, a rear annular groove portion, and an annular raised portion raised between the forward and rear annular groove portions. The annular raised portion has substantially the same radius as that of the forward annular valve surface portion. The seal ring is fitted and fixed in the annular groove and has a U-shape in a section containing the axis and an outer diameter larger than that of the forward annular valve surface portion but smaller than that of the rear annular valve surface portion.

In the coupling member according to the present invention, the forward annular passage limiting portion or the rear annular passage limiting portion of the on-off valve is moved while keeping in contact with or close proximity to the annular valve seat surface until the on-off valve reaches a position where it substantially opens the fluid passage, as stated above. Therefore, the flow of fluid flowing around the seal ring of the on-off valve is limited. When the forward annular passage limiting portion and/or the rear annular passage limiting portion separates from the annular valve seat surface and, consequently, a large amount of fluid flows around the seal ring of the on-off valve, the cross-section of the fluid passage around the seal ring has already become larger than a specific size. Accordingly, there is no excessive force that would otherwise be applied to the seal ring. Thus, separation of the seal ring can be prevented.

Further, in the coupling member according to the present invention, the rear annular groove portion is shallower than the forward annular groove portion. Separation of the seal ring starts from the rear annular seal portion fixed in the rear annular groove portion. In this regard, because the rear annular groove portion is shallowed, the radial wall thickness of the rear annular seal portion of the seal ring, which is fitted in the rear annular groove portion, is reduced. Consequently, even if excessive force is applied to the rear annular seal portion by rapid flow of fluid, deformation of the seal portion is smaller than in the conventional on-off valve as shown in FIG. 1. Accordingly, separation of the seal ring becomes unlikely to occur.

Further, in the seal ring having a U-shaped section, the rear annular seal portion fitted in the rear annular groove portion is held and fixed between the annular raised portion and the rear annular valve surface portion. Therefore, deformation of the seal ring due to force applied thereto from the fluid is minimized. Accordingly, separation of the seal ring can be prevented.

BRIEF DESCRIPTION OF THE DRAWINGS

FIG. 1 is a partly-sectioned side view showing an on-off valve in a conventional coupling member.

FIG. 2 is a partly-sectioned side view of a pipe coupling according to the present invention, showing a state where a male coupling member and a female coupling member are disconnected from each other.

FIG. 3 is a view showing a state where the male coupling member and the female coupling member are coupled to each other.

FIG. 4 is a partly-sectioned side view of the female coupling member disconnected from the male coupling member.

FIG. 5 is a view showing the female coupling member in a state where the male coupling member has begun to be inserted into the female coupling member.

FIG. 6 is a view showing the female coupling member in a state where the male coupling member has been further inserted into the female coupling member.

FIG. 7 is a view showing the female coupling member in a state where the male coupling member has been completely coupled to the female coupling member and an on-off valve has reached an open position.

FIG. 8 is a sectional view of the on-off valve, showing a second embodiment of a seal ring.

FIG. 9 is a view showing a third embodiment of the seal ring.

FIG. 10 is a view showing a fourth embodiment of the seal ring.

DETAILED DESCRIPTION OF THE PREFERRED EMBODIMENTS

Embodiments of a coupling member of a pipe coupling according to the present invention will be described below with reference to the accompanying drawings.

FIG. 2 shows a female coupling member 22 and a male coupling member 24 of a pipe coupling 20 according to the present invention in a state where the coupling members 22 and 24 are disconnected from each other. FIG. 3 shows a state where the female coupling member 22 and the male coupling member 24 are coupled to each other. FIGS. 4 to 7 show the movement of an on-off valve 26 of the female coupling member 22 during coupling of the female coupling member 22 to the male coupling member 24. FIGS. 8 to 10 show various embodiments of a seal ring 50 of the on-off valve 26.

As shown in FIG. 2, the female coupling member 22 has a tubular member 32 with a fluid passage 30 and an on-off valve 26 provided in the fluid passage 30 of the tubular member 32. An annular valve seat surface 34 is formed on the inner peripheral surface of the tubular member 32 so as to surround the fluid passage 30. The on-off valve 26 is movable between a closed position (FIG. 2) where it is engaged under pressure with the annular valve seat surface 34 to close the fluid passage 30 and an open position (FIG. 3) where the on-off valve 26 is displaced rearward in the axial direction of the fluid passage 30 to separate from the annular valve seat surface 34, thereby opening the fluid passage 30.

The male coupling member 24 has a tubular member 42 with a fluid passage 40 and a fixed valve member 44 extending along the axis of the tubular member 42 and fixedly secured to the tubular member 42. The male coupling member 24 further has a tubular movable valve member 46 slidably provided in the tubular member 42. The movable valve member 46 is movable between a closed position (FIG. 2) where it sealingly engages the fixed valve member 44 to close the fluid passage 40 and an open position (FIG. 3) where the movable valve member 46 is displaced rearward from the closed position to open the fluid passage 40.

The on-off valve 26 of the female coupling member 22 has an annular valve surface 48 facing the annular valve seat surface 34 and a seal ring 50 provided on the annular valve surface 48. When the on-off valve 26 is in the closed position (FIG. 2) for closing the fluid passage 30, the seal ring 50 is sealingly engaged under pressure with the annular valve seat surface 34. The annular valve surface 48 has a forward annular valve surface portion 52 located forward of the seal ring 50 and a rear annular valve surface portion 54 located rearward of the seal ring 50. The forward annular valve surface portion 52 and the rear annular valve surface portion 54 respectively have a forward annular passage limiting portion 56 and a rear annular passage limiting portion 58 that are adapted to be substantially in contact with the annular valve seat surface 34.

The annular valve seat surface 34 has an annular sealing valve seat surface 34-1 that is sealingly engaged by the seal ring 50 when the on-off valve 26 is in the closed position. The annular valve seat surface 34 further has an annular forward valve seat surface 34-2 and an annular rear valve seat surface 34-3 located forward and rearward, respectively, of the annular sealing valve seat surface 34-1. The annular forward and rear valve seat surfaces 34-2 and 34-3 respectively have a forward axial surface 34-2' and a rear axial surface 34-3' that extend substantially parallel to the axis of the tubular member 32.

During the period from when the on-off valve 26 starts to move from the closed position (FIGS. 2 and 4) toward the open position (FIGS. 3 and 7) until the seal ring 50 has separated from the annular valve seat surface 34 by a predetermined distance, the forward annular passage limiting portion 56 and the rear annular passage limiting portion 58 are moved while keeping substantially in contact with the forward axial surface 34-2' and the rear axial surface 34-3', respectively.

As shown in FIGS. 4 to 7, the annular valve surface 48 of the on-off valve 26 has an annular groove 60 formed between the forward and rear annular valve surface portions 52 and 54. The seal ring 50 is fitted and fixed in the annular groove 60.

The annular groove 60 has a forward annular groove portion 60-1 and a rear annular groove portion 60-2 shallower than the forward annular groove portion 60-1. The rear annular valve surface portion 54 of the annular valve surface 48 has a larger radius than that of the forward annular valve surface portion 52. The seal ring 50 has a forward annular seal portion 50-1 (FIG. 5) fitted in the forward annular groove portion 60-1 and having a larger radius than that of the forward annular valve surface portion 52 of the annular valve surface 48. The seal ring 50 further has a rear annular seal portion 50-2 contiguous with the forward annular seal portion 50-1 and having an outer diameter that is substantially the same as that of the forward annular seal portion 50-1 but smaller than that of the rear annular valve surface portion 54. The rear annular seal portion 50-2 is fitted and fixed in the rear annular groove portion 60-2.

When the female coupling member 22 and the male coupling member 24 that are in the respective positions shown in FIG. 2 are to be brought into the coupled position shown in FIG. 3, the female coupling member 22 and the male coupling member 24 are abutted against each other so that the fixed valve member 44 of the male coupling member 24 pushes the on-off valve 26 of the female coupling member 22 rearward relative to the tubular member 32 of the female coupling member 22, thereby moving the on-off valve 26 from the closed position to the open position.

As has been stated above, during the period from when the on-off valve 26 starts to move from the closed position (FIGS. 2 and 4) toward the open position (FIGS. 3 and 7) until the seal ring 50 has separated from the annular valve seat surface 34 by a predetermined distance, the forward annular passage limiting portion 56 and the rear annular passage limiting portion 58 are moved while keeping substantially in contact with the forward axial surface 34-2' and the rear axial surface 34-3', respectively, as shown in FIGS. 5 and 6. In other words, the forward annular passage limiting portion 56 and the rear annular passage limiting portion 58 are, as shown in FIGS. 5 and 6, moved while keeping substantially in contact with the forward axial surface 34-2' and the rear axial surface 34-3', respectively. That is, when the forward annular passage limiting portion 56 and the rear annular passage limiting portion 58 separate rearward from the forward axial surface 34-2' and the rear axial surface 34-3', respectively, and thus the on-off valve 26 opens the fluid passage 30, a flow passage of predetermined width has already been formed between the seal ring 50 and the annular valve seat surface 34. Therefore, the flow speed of the fluid flowing around the seal ring 50 at this time is by far reduced (as compared with a case where the fluid starts to flow soon after the seal ring starts to separate from the annular valve seat surface to open the fluid passage as in the conventional coupling members). Accordingly, the force applied to the seal ring 50 from the fluid is minimized. In addition, the seal ring 50 has a reduced radial wall thickness at the rear annular seal portion 50-2. Therefore, the amount to which the seal ring 50 is deformed radially outward by the force applied thereto from the fluid is reduced, and the occurrence of separation of the seal ring 50 is minimized.

FIGS. 8 to 10 show modifications of the seal ring 50 and the annular groove 60.

FIG. 8 shows a modification in which the rear annular groove portion 60-2 has a rear extension groove portion 60-3 extending rearward by a predetermined length at a position radially inward of the rear annular valve surface portion 54 of the annular valve surface, and the rear annular seal portion 50-2 extends to be fitted and fixed in the rear extension groove portion 60-3 of the rear annular groove portion 60-2. This structure can offer increased resistance to the seal ring separating force applied by the flow of fluid.

The modification shown in FIG. 9 is substantially the same as the modification shown in FIG. 8 except that the rear extension groove portion 60-3 and the rear annular seal portion 50-2 fitted therein are slightly modified in shape.

FIG. 10 shows a modification in which the annular groove 60 of the on-off valve 26 has a forward annular groove portion 60-1, a rear annular groove portion 60-2, and an annular raised portion 60-4 raised between the two annular groove portions 60-1 and 60-2, and the annular raised portion 60-4 has substantially the same radius as that of the forward annular valve surface portion 52. The seal ring 50 has a U-shape in a section containing the axis of the fluid passage 30. The outer diameter of the seal ring 50 is larger than that of the forward annular valve surface portion 52 but smaller than that of the rear annular valve surface portion 54. The rear annular seal portion 50-2, which is fitted in the rear annular groove portion 60-2, is held and fixed between the annular raised portion and the rear valve surface portion. Therefore, the deformation of the seal ring 50 due to the negative pressure applied thereto from the fluid is minimized. Accordingly, separation of the seal ring 50 can be prevented.

Although embodiments of the female coupling member of the pipe coupling according to the present invention have been described above, the present invention is not necessarily limited to the described embodiments. For example, the present invention is also applicable to a female coupling member. In addition, the configuration of the seal ring can be modified in a variety of ways. For example, the wall thickness of the rear annular seal portion 50-2, which is likely to separate, may be reduced.

The invention claimed is:

1. A coupling member of a pipe coupling having a male coupling member and a female coupling member that are couplable to each other;

the coupling member comprising:

a tubular member having a fluid passage, the tubular member having an annular valve seat surface formed so as to surround said fluid passage; and an on-off valve provided in the fluid passage of the tubular member, the on-off valve being movable between a closed position where it is engaged under pressure with the annular valve seat surface to close the fluid passage and an open position where the on-off valve is displaced rearward in the axial direction of the fluid passage to separate from the annular valve seat surface, thereby opening the fluid passage;

the on-off valve comprising:

an annular valve surface located so as to face the annular valve seat surface when the on-off valve is in the closed position; and a seal ring fitted and fixed in an annular groove formed circumferentially in the annular valve surface;

the annular groove comprising a stepped bottom surface which comprises a first surface bottom having a first diameter, a second bottom surface positioned rearward of the first bottom surface and having a second diameter greater than the first diameter, and an intermediate surface connecting the first and bottom surfaces;

the seal ring having a cross section complementary to a cross section of the annular groove and comprising a forward annular seal portion positioned on the first bottom surface and a rear annular seal portion position on the second bottom surface and contiguous with the forward annular seal portion, the rear annular portion having an outer diameter that is substantially same as that of the forward annular seal portion.

* * * * *